(12) United States Patent
Fan et al.

(10) Patent No.: US 9,919,455 B2
(45) Date of Patent: Mar. 20, 2018

(54) METHODS FOR FORMING A LENS PLATE FOR AN INTEGRATED CAMERA USING UV-TRANSPARENT MOLDS AND METHODS FOR FORMING UV-TRANSPARENT MOLDS

(75) Inventors: Regis Fan, Saint Paul, MN (US); Goran Rauker, Longmont, CO (US); George Barnes, Westminster, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1299 days.

(21) Appl. No.: 13/592,308

(22) Filed: Aug. 22, 2012

(65) Prior Publication Data
US 2014/0054807 A1 Feb. 27, 2014

(51) Int. Cl.
 B29C 33/38 (2006.01)
 B29D 11/00 (2006.01)
 B29C 35/08 (2006.01)
 B29C 33/00 (2006.01)

(52) U.S. Cl.
 CPC .......... *B29C 33/38* (2013.01); *B29C 33/3857* (2013.01); *B29C 35/0888* (2013.01); *B29C 35/0894* (2013.01); *B29D 11/00298* (2013.01); *B29D 11/00307* (2013.01); *B29C 2033/0005* (2013.01); *B29C 2035/0827* (2013.01)

(58) Field of Classification Search
 CPC . B29C 33/38; B29C 33/3857; B29C 35/0888; B29C 2033/0005; B29C 35/0894; B29C 2035/0827; B29D 11/00307; B29D 11/00298
 See application file for complete search history.

(56) References Cited

U.S. PATENT DOCUMENTS

| 4,689,291 A * | 8/1987 | Popovic .................. G03F 7/001 |
| | | 359/900 |
| 7,094,304 B2 * | 8/2006 | Nystrom et al. .............. 156/242 |
| 2010/0079642 A1 * | 4/2010 | Kurimoto et al. ............. 348/294 |

FOREIGN PATENT DOCUMENTS

| CN | 102458807 A | 5/2012 |
| JP | 5119203 A | 5/1993 |
| JP | 2005041125 A | 2/2005 |
| TW | 200944836 A | 11/2009 |
| WO | WO 2009/092000 | * 7/2009 |

OTHER PUBLICATIONS

Taiwanese Patent Application No. 102127002 Notice of Allowance dated Dec. 29, 2015, 3 pages.

(Continued)

*Primary Examiner* — Mathieu Vargot
(74) *Attorney, Agent, or Firm* — Lathrop Gage LLP

(57) ABSTRACT

Suspended lenses in a spacer wafer and lens-in-a-pocket structures are replicated from UV-transparent molds. The fabrication of UV-transparent molds can include providing a substrate with pedestals, fabricating a lens on each pedestal using a step-and-repeat process, replicating an intermediate mold from the substrate with pedestals having lenses on the pedestals, and replicating a UV-transparent mold from the intermediate mold. The fabrication of UV-transparent molds can also include providing a substrate with holes, fabricating a lens in each hole and replicating a UV-transparent mold from the substrate with the holes having the lenses.

13 Claims, 14 Drawing Sheets

(56) References Cited

OTHER PUBLICATIONS

Chinese Patent Application No. 201310325838.3 Office Action, dated Jun. 11, 1015, with English translation, 21 pages.
Taiwanese Patent Application No. 102127002 Office Action, dated May 27, 2015, with English translation, 14 pages.
English abstract of Chinese Patent No. CN102458807, publication date May 16, 2012, 2 pages.
English abstract of Japanese Patent No. JP5119203, publication date May 18, 1993, 2 pages.
English abstract of Japanese Patent No. JP2005041125, publication date Feb. 17, 2005, 2 pages.
English abstract of Taiwanese Patent No. TW200944836, publication date Nov. 1, 2009, 1 page.
Chinese Patent Application No. 201310325838.3 Notice of Allowance dated Feb. 6, 2016, 3 pages.

* cited by examiner

Substrate with Pedestals

UV Cure    UV Cure    UV Cure

Substrate with Pedestals

UV Cure    UV Cure    UV Cure

Substrate with Holes

METHODS FOR FORMING A LENS PLATE FOR AN INTEGRATED CAMERA USING UV-TRANSPARENT MOLDS AND METHODS FOR FORMING UV-TRANSPARENT MOLDS

BACKGROUND

This disclosure relates to integrated cameras and, more particularly, to methods for forming lens plates for integrated cameras.

An integrated camera is a camera formed by integrated device fabrication techniques or processes such as photolithography, ion implantation, diffusion, etching, and other techniques or processes typically used in fabricating semiconductor integrated circuits. Multiple independent, separate integrated camera chips or dies can be fabricated in a single wafer. Integrated cameras are typically very small in size, such that they are suited for applications such as mobile telephones, smart phones, notebook computers, tablet computers, and other similar devices.

Integrated cameras typically include optics such as lenses and other devices used in forming images, as well as a sensor or detector or sensor/detector array for receiving images. To form a high-quality image, the optics of the camera module may include several lenses, which are stacked above the image sensor and are separated by spacers.

The integrated camera is typically manufactured at the wafer level. Under a typical process, a wafer having a plurality of image sensors is first provided. A spacer wafer is placed on the image sensor wafer. The spacer wafer has a plurality of holes aligned with the image sensors. A wafer having a plurality of lenses, known as a lens plate, is then placed on the spacer wafer. The lenses of the lens plate and the holes of the spacer wafer are aligned with the image sensors. A second spacer wafer may be provided before a second lens plate having another plurality of aligned lenses is placed on the wafer stack. Multiple spacer wafers and multiple lens plates may be included in the manufacturing of wafer level cameras. The stacked wafers are diced into individual integrated cameras, each having an image sensor and a stack of spacers and lenses.

FIG. 1 contains a schematic cross-sectional diagram illustrating a conventional lens plate 100. The lens plate 102 includes a glass wafer 102 and a plurality of lenses 104 formed on glass wafer 102. FIG. 2 contains a schematic cross-sectional diagram illustrating two stacked conventional lens plates 202 and 204. The two lens plates 202 and 204 are separated by a spacer wafer 206 stacked between lens plates 202 and 204. The glass wafer plates can adversely affect the quality of the lenses fabricated on the wafers. Also, the light transmission through the glass wafers can adversely affect the brightness and the phase of the light, and, as a result, may degrade the quality of the image formed. These effects can depend on the thickness of the glass wafers. That is, glass wafers with greater thickness will have more pronounced adverse effects on the quality of the lenses and the image formed by the camera.

SUMMARY

According to one aspect, a method of fabricating an ultraviolet (UV)-transparent mold is provided. According to the method, at least one pedestal is formed on a substrate, and a lens is fabricated on each pedestal. An intermediate mold is replicated from the substrate with the pedestal and the lens. The UV-transparent mold is replicated from the replicated intermediate mold.

According to another aspect, a method of fabricating a UV-transparent mold is provided. According to the method, at least one hole is formed in a substrate, and a lens is fabricated in each hole. The UV-transparent mold is replicated from the substrate with the hole and the lens in each hole.

According to another aspect, a method of fabricating a lens plate is provided. According to the method, at least one pedestal is formed on a substrate, and a lens is fabricated on the pedestal. An intermediate mold is replicated from the substrate with the pedestal, and a UV-transparent mold is replicated from the replicated intermediate mold. Lenses in a spacer wafer are replicated from the UV-transparent mold.

According to another aspect, a method of fabricating a lens plate is provided. According to the method, at least one hole is formed in a substrate, and a lens is fabricated in the hole. A UV-transparent mold is replicated from the substrate with the hole having the lens. Lenses in a spacer wafer are replicated from the UV-transparent mold.

BRIEF DESCRIPTION OF THE DRAWINGS

The foregoing and other features and advantages of the disclosure will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION

According to some exemplary embodiments, a master of a lens shape (or its inverse) can be formed by diamond turning a pin. The pin is used in step-and-repeat fashion to make each of a plurality of lens shapes (or their inverses) on a wafer-sized mold on corresponding pedestals or in corresponding holes formed on or in a wafer. The wafer-sized mold can then be used to form the final object directly or can be used as an intermediate mold to form a final mold. The pin may not be UV-transparent, so the wafer-sized mold can be UV-transparent, so that epoxy can be cured through the mold. Further molds may or may not also be UV-transparent so the epoxy can be cured through the molds.

Figure 1:
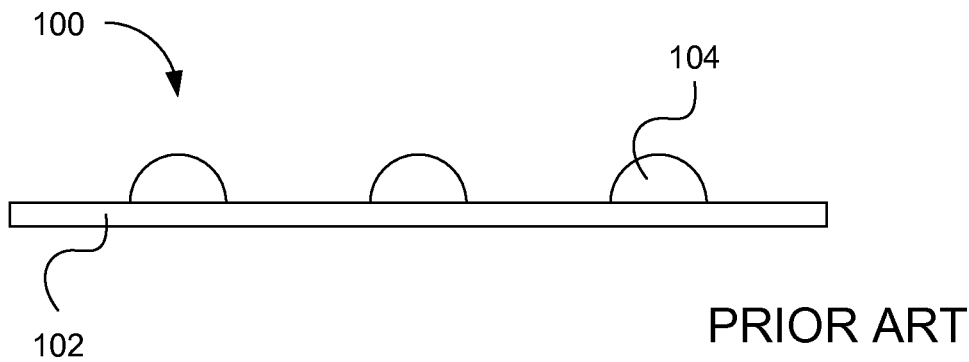
FIG. 1 includes a schematic cross-sectional diagram illustrating a conventional lens plate.
Figure 2:
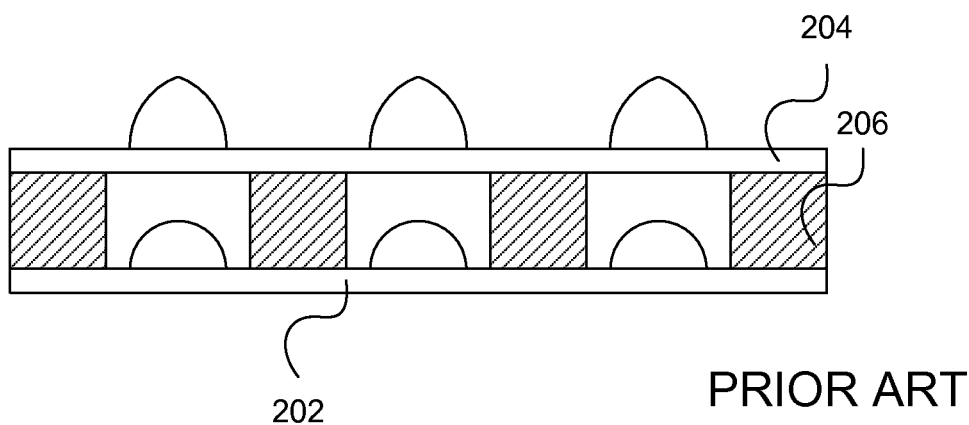
FIG. 2 includes a schematic cross-sectional diagram illustrating two lens plates stacked using a spacer wafer.
Figure 3:
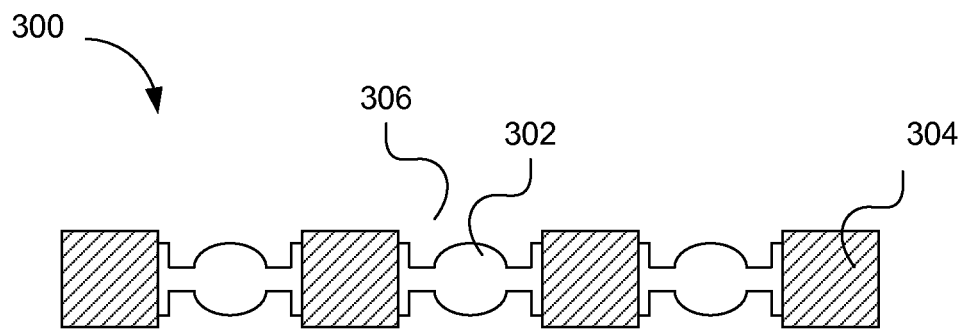
FIG. 3 includes a schematic cross-sectional diagram illustrating lenses suspended in a spacer wafer, according to some exemplary embodiments.

FIG. 3 includes a schematic cross-sectional diagram of a lens plate, according to some exemplary embodiments. Referring to FIG. 3, according to some exemplary embodiments, a lens plate 300 includes a plurality of suspended lenses 302, which eliminate the need for a glass wafer 102, as used in conventional wafer-level integrated cameras. That is, according to some exemplary embodiments, suspended lenses 302 are formed within holes 306 of a spacer wafer 304. Suspended lenses 302 are suspended from and adhered to an inner wall of holes 306 in spacer wafer 304. In this manner, the glass wafer 102 of conventional wafer-level integrated cameras illustrated in FIG. 1 can be eliminated, since the suspended lenses 302 are suspended from the side wall of spacer wafer 304, instead of being vertically supported by glass wafer 102.

Figure 4:
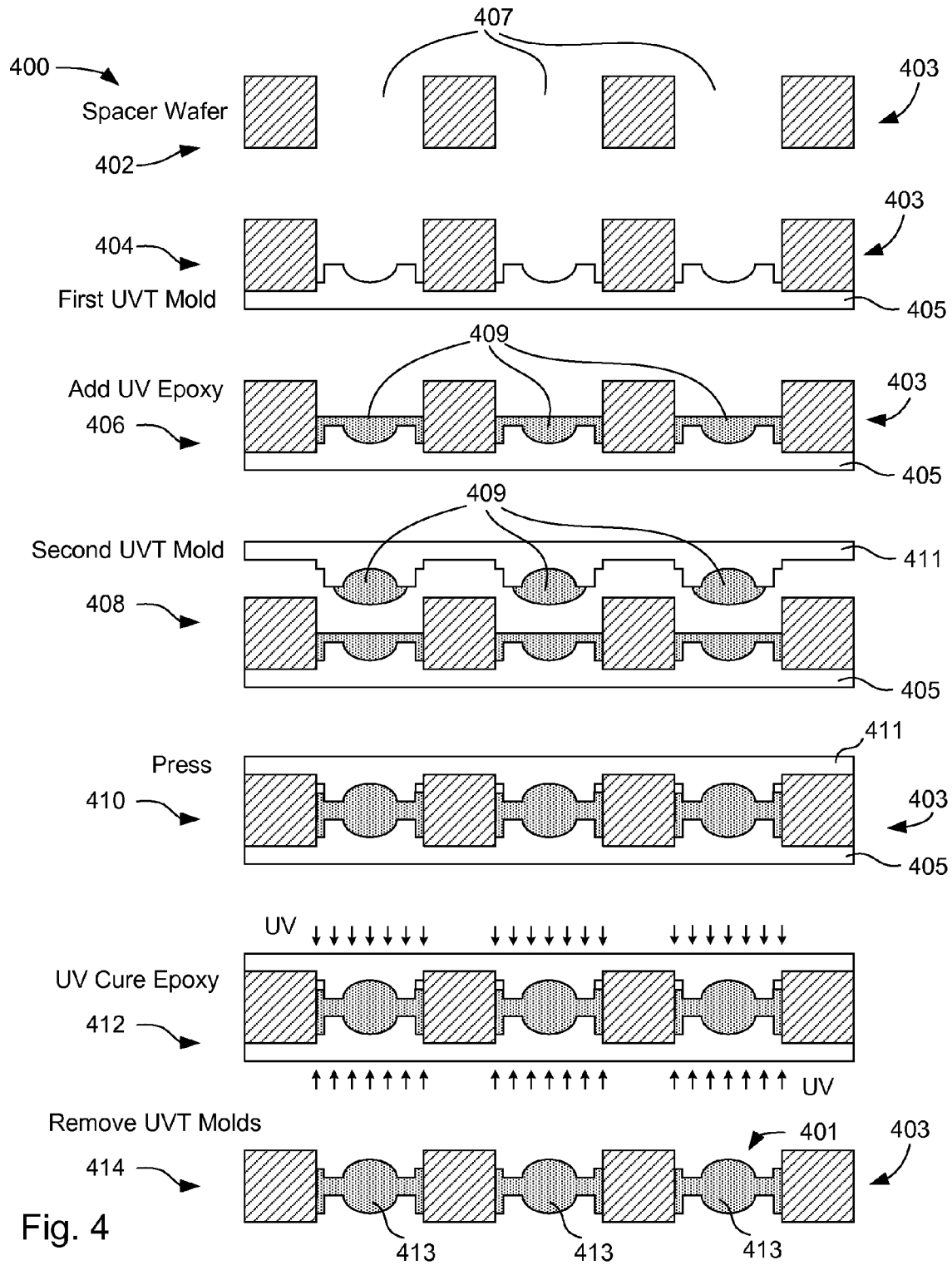
FIG. 4 includes schematic cross-sectional diagrams illustrating a process for fabricating lenses suspended in a spacer wafer using UV-transparent molds, according to some exemplary embodiments.

FIG. 4 includes a series of schematic cross-sectional diagrams which illustrate a process 400 for fabricating a lens plate using a UV-transparent (UVT) mold, according to some exemplary embodiments. In some exemplary embodiments, the UVT mold may be a PDMS (polydimethylsiloxane) mold. The PDMS mold can be cured by a cross-linking reaction to create an optically transparent polymer with the ability to reproduce surface micro features.

Referring to FIG. 4, in step 402, a spacer wafer forming a plurality of holes 407 is provided. Next, in step 404, spacer wafer 403 is placed on a first UVT mold 405. Next, in step 406, UV epoxy 409 is dispensed into holes 407 in spacer wafer 403 on first UVT mold 405. In some exemplary embodiments, a drop of UV epoxy 409 is dispensed in holes 407 of spacer wafer 403. In step 408 a drop of UV epoxy 409 is dispensed into a second UVT mold 411. In step 410, second UVT mold 411 is pressed against spacer wafer 403. In step 412, epoxy 409 is UV-cured by exposure of UV epoxy 409 to UV radiation through UVT molds 405, 411. In step 414, UVT molds 405, 411 are removed, and suspended lenses 413 are formed adhered to side walls of spacer wafer 403. The resulting plurality of suspended lenses 413 and spacer wafer 403 together forms a lens plate 401.

Figure 5:
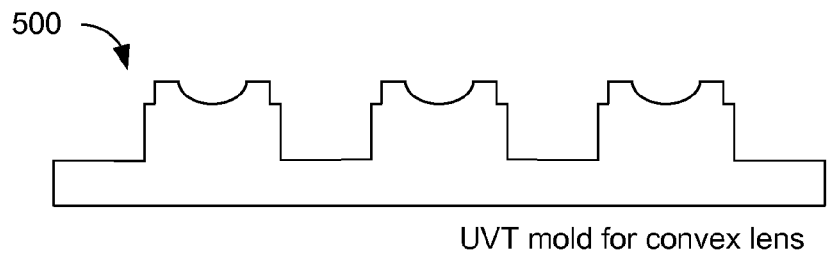
FIG. 5 includes a schematic cross-sectional diagram illustrating a UV-transparent mold for forming convex lens, according to some exemplary embodiments.
Figure 6:
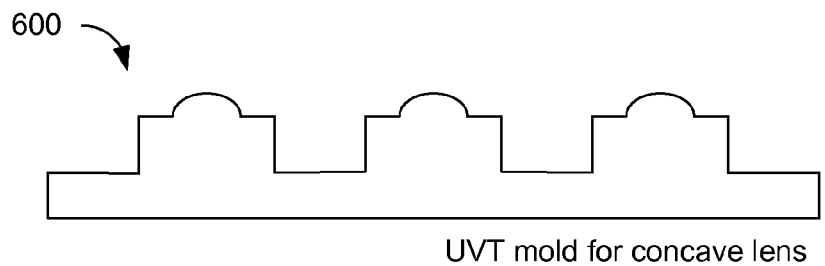
FIG. 6 includes a schematic cross-sectional diagram illustrating a UV-transparent mold for forming concave lens, according to some exemplary embodiments.

FIGS. 5 and 6 include schematic cross-sectional diagrams of UVT molds 500 and 600 for convex lenses and concave lenses, respectively, according to some exemplary embodiments. As described in detail herein, multiple lenses are formed on a spacer wafer at the same time. Accordingly, the UV-transparent mold is approximately the same size as a spacer wafer. In general, multiple individual lens molds are included in a UV-transparent mold having the size of the wafer. However, for ease of illustration, only three such individual lens molds are shown in FIGS. 5 and 6.

Fabrication of UVT molds 500 and 600 shown in FIGS. 5 and 6, respectively, will be described in detail hereinbelow. First, the fabrication of the UV-transparent mold for concave lens 600 shown in FIG. 6 is described. According to some exemplary embodiments, there are two methods for fabricating the UV-transparent mold for concave lens 600 described herein in detail. The first method includes the use of a substrate with pedestals.

Figure 7A:
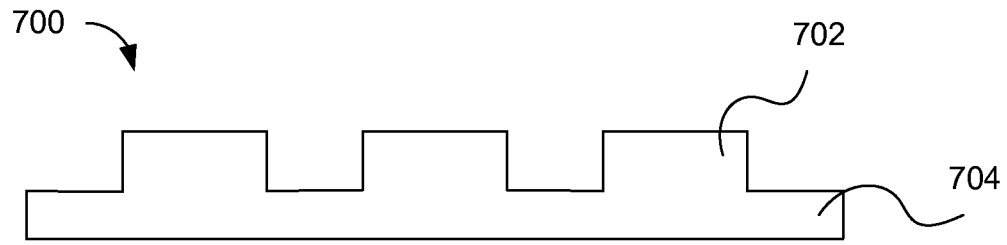
FIGS. 7(a) through 7(d) include schematic cross-sectional diagrams illustrating a method for fabricating a UV-transparent mold for concave lenses using a substrate with pedestals, according to some exemplary embodiments.
Figure 7B:
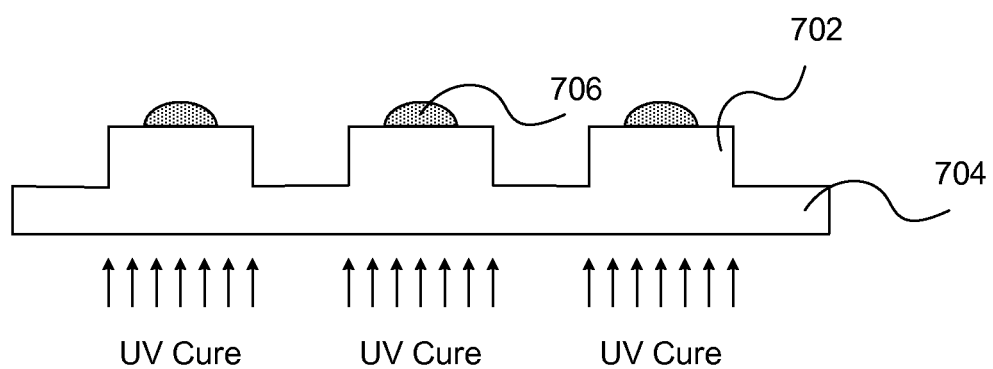
Figure 7C:
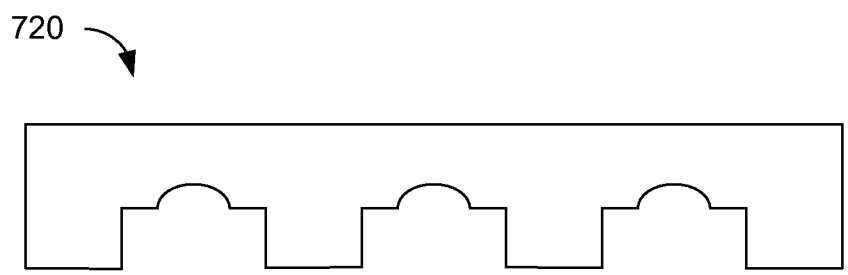
Figure 7D:
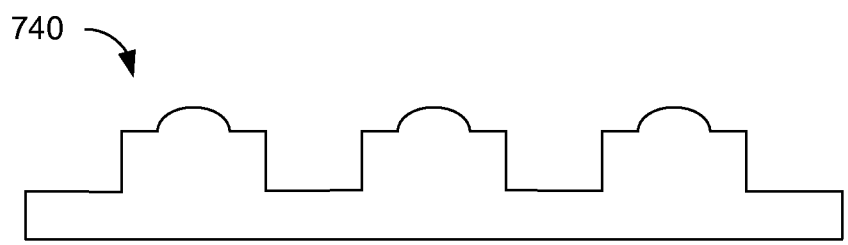

FIGS. 7(a) through 7(b) include schematic cross-sectional diagrams illustrating a method for fabricating a UV-transparent mold for concave lenses using a substrate with pedestals, according to some exemplary embodiments. Referring to FIG. 7(a), a substrate with pedestals is shown. That is, device 700 includes multiple pedestals 702 on a substrate 704. FIG. 7(b) illustrates the formation of convex lenses 706, which are formed by a step-and-repeat process, which is described in more detail in connection with FIG. 8. In some exemplary embodiments, lens 706 is made from UV epoxy. UV light is used to cure lenses 706 through substrate 704 and pedestals 702, since lens 706 is covered by a step-and-repeat mold, which is typically made of metal and is not UV transparent.

Figure 8:
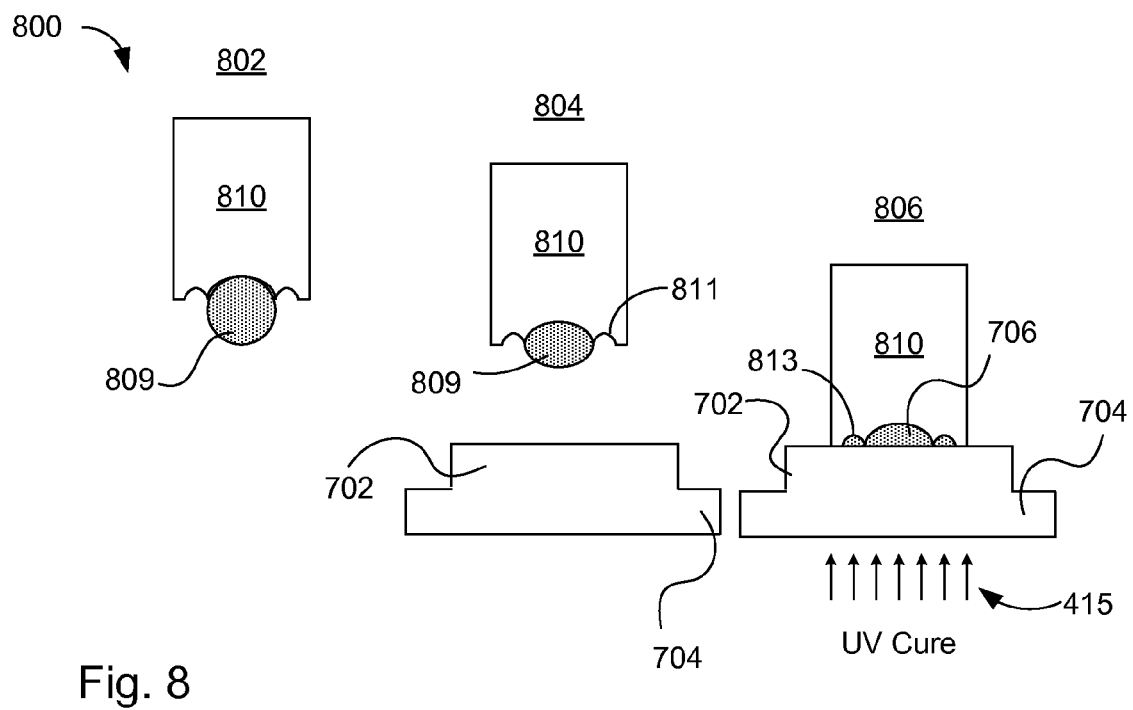
FIG. 8 includes schematic cross-sectional diagrams illustrating a step-and-repeat process for forming a lens on a pedestal or in a hole, according to some exemplary embodiments.

FIG. 8 includes a series of schematic cross-sectional diagrams which illustrate a step-and-repeat process 800, according to some exemplary embodiments. In step 802, a drop of UV epoxy 809 is dispensed into a step-and-repeat master pin 810, which in some exemplary embodiments can be a diamond-turned metal pin. In step 804, step-and-repeat master pin 810 is lowered toward pedestal 702. In step 806, step-and-repeat master pin 810 is pressed against pedestal 702, and lens 706 is cured by radiating lens 706 with UV light 415 through substrate 704 with pedestals 702, which is UV-transparent. Pin 810 may include a recess 811 to receive any overflow epoxy 813 from lens 706. After lens 706 is UV cured, step-and-repeat master pin 810 steps to the next pedestal 702, and the process is repeated for the next lens 706. The process is repeated until all lenses 706 are made on all pedestals 702 of substrate 704.

FIG. 7(*c*) illustrates an intermediate mold 720, which is replicated from substrate-with-pedestals device 700 having lenses 706 on pedestals 702. In some exemplary embodiments, intermediate mold 720 may be a plastic mold. FIG. 7(*d*) illustrates a UV-transparent mold 740, which is replicated from intermediate mold 720. In some exemplary embodiments, UV-transparent mold 740 is a PDMS mold, which is cured by a cross-linking reaction to create an optically transparent polymer with the ability to reproduce surface micro features. UV-transparent mold 740 can be used as the first and/or second UV-transparent mold in process 400 for fabricating suspended lenses in a spacer wafer as illustrated in FIG. 4.

Figure 9A:
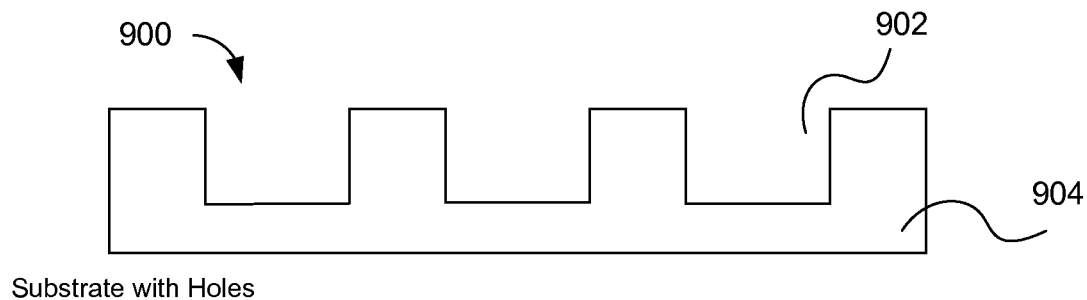
FIGS. 9(a) through 9(c) include schematic cross-sectional diagrams illustrating a method for fabricating a UV-transparent mold for concave lenses using a substrate with holes, according to some exemplary embodiments.
Figure 9B:
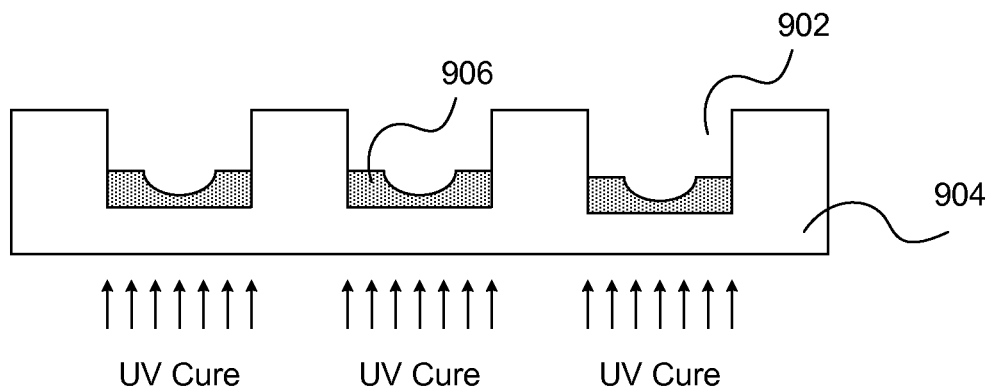
Figure 9C:
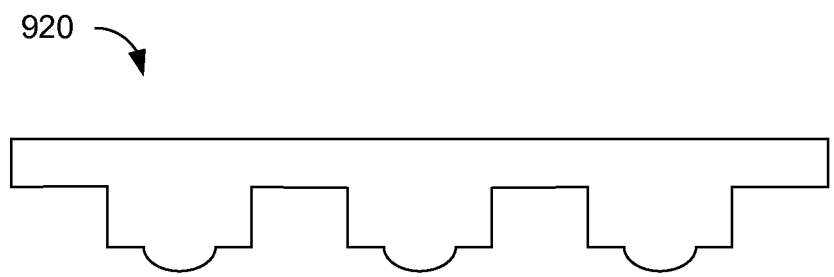
Figure 10A:
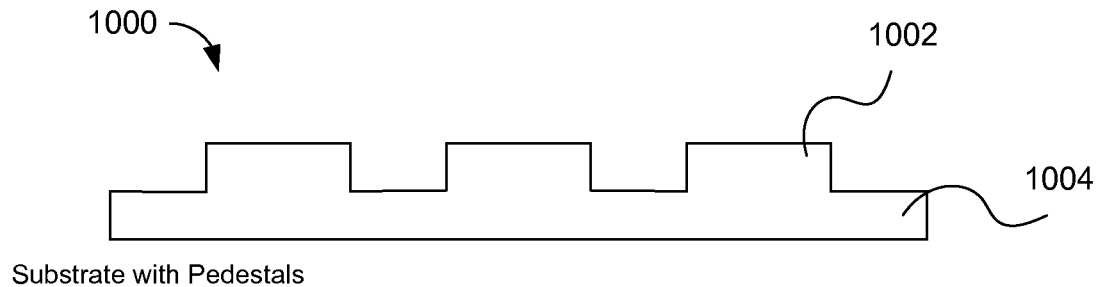
FIGS. 10(a) through 10(d) include schematic cross-sectional diagrams illustrating a method for fabricating a UV-transparent mold for convex lenses using a substrate with pedestals, according to some exemplary embodiments.
Figure 10B:
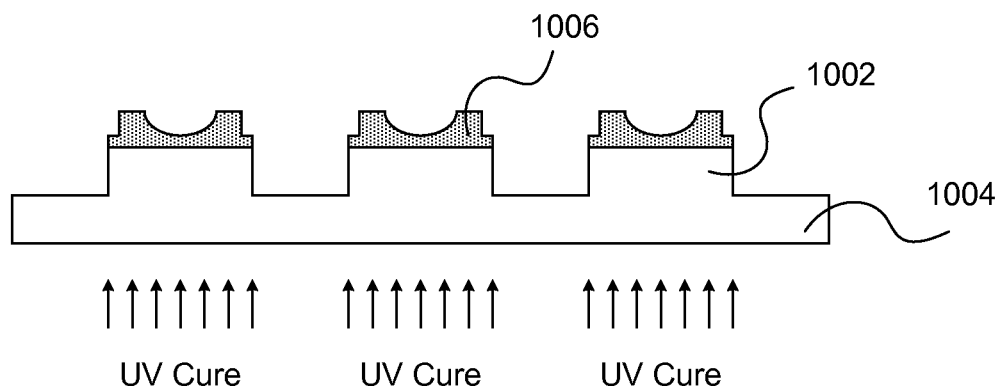
Figure 10C:
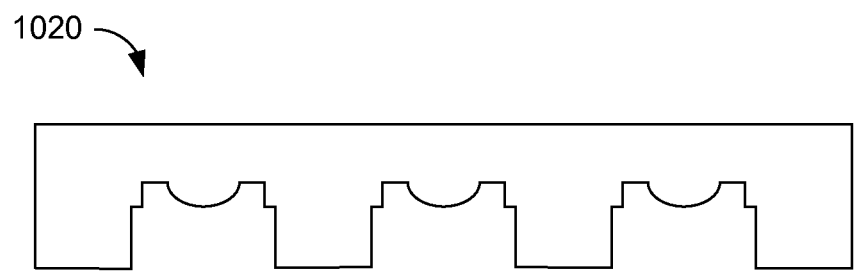
Figure 10D:
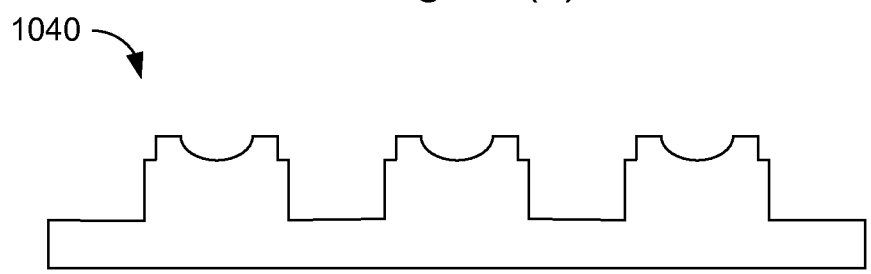

The second method for fabricating the UV-transparent mold for concave lenses 600 includes using a substrate that forms holes. FIGS. 9(*a*) through 9(*c*) include schematic cross-sectional diagrams illustrating a method for fabricating a UV-transparent mold for concave lenses using a substrate with holes, according to some exemplary embodiments. Referring to FIG. 9(*a*), a substrate-with-holes device 900 includes a substrate 904 forming holes 902. Referring to FIG. 9(*a*), a concave lens 906 is made in hole 902 on substrate 904 using a step-and-repeat process, such as step-and-repeat process 800 illustrated in FIG. 8. In some exemplary embodiments, lens 906 is made from UV epoxy. As illustrated in FIG. 9(*b*), UV light is used to cure lens 906 through substrate 904, since lens 906 is covered by a step-and-repeat mold, which is typically made of metal and is not UV transparent.

After concave lenses 906 are formed and cured by exposing lenses 906 to UV light through the substrate 904 with holes 902, a UV-transparent mold 920 can be replicated from substrate-with-holes device 900 having concave lenses 906 in holes 902, without intermediate mold replication, as shown in FIG. 9(*c*). UV-transparent mold 920 may be a PDMS mold or other UV-transparent mold made of another UV-transparent material, which is cured by a cross-linking reaction to create an optically transparent polymer with the ability to reproduce surface micro features. UV-transparent mold 920 can be used as the first and/or second UV-transparent mold in process 400 for fabricating suspended lenses in a spacer wafer as illustrated in FIG. 4.

Similarly, there are also two methods for fabricating the UV-transparent mold for convex lens 500 of FIG. 5. The first method includes using a substrate with pedestals. FIGS. 10(*a*) through 10(*d*) include schematic cross-sectional diagrams illustrating a method for fabricating a UV-transparent mold for convex lenses using a substrate with pedestals, according to some exemplary embodiments.

Referring to FIG. 10(*a*), according to some exemplary embodiments, a substrate-with-pedestals device 1000 includes a substrate 1004 and multiple pedestals 1002. Referring to FIG. 10(*b*), concave lenses 1006 are made on pedestals 1002 using the step-and-repeat process 800 of FIG. 8. Lenses 1006 are cured by exposing them to UV light through substrate 1004 and pedestal 1002. FIG. 10(*c*) illustrates an intermediate mold 1020, which is replicated from substrate-with-pedestals device 1000 having multiple concave lenses 1006 on pedestals 1002. FIG. 10(*d*) illustrates a UV-transparent mold 1040, which is replicated from intermediate mold 1020. UV-transparent mold 1040 may be a PDMS mold, or other type of UV-transparent mold made of another UV-transparent material, which is cured by a cross-linking reaction to create an optically transparent polymer with the ability to reproduce surface micro features. UV-transparent mold 1040 can be used as the first and/or second UV-transparent mold in process 400 for fabricating suspended lenses in a spacer wafer as illustrated in FIG. 4.

Figure 11A:
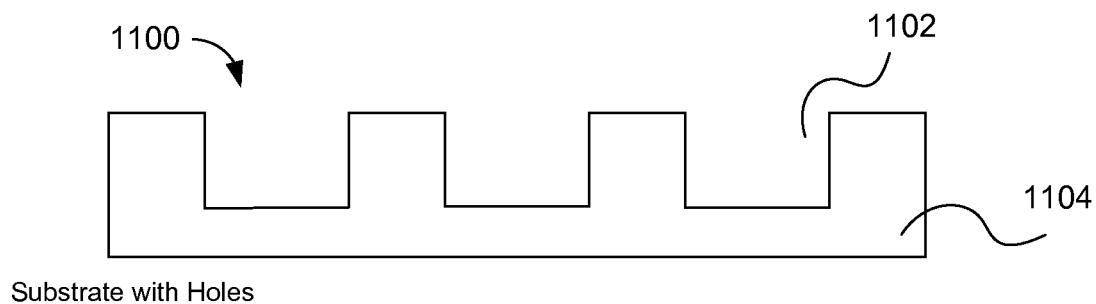
FIGS. 11(a) through 11(c) include schematic cross-sectional diagrams illustrating a method for fabricating a UV-transparent mold for convex lenses using a substrate with holes, according to some exemplary embodiments.
Figure 11B:
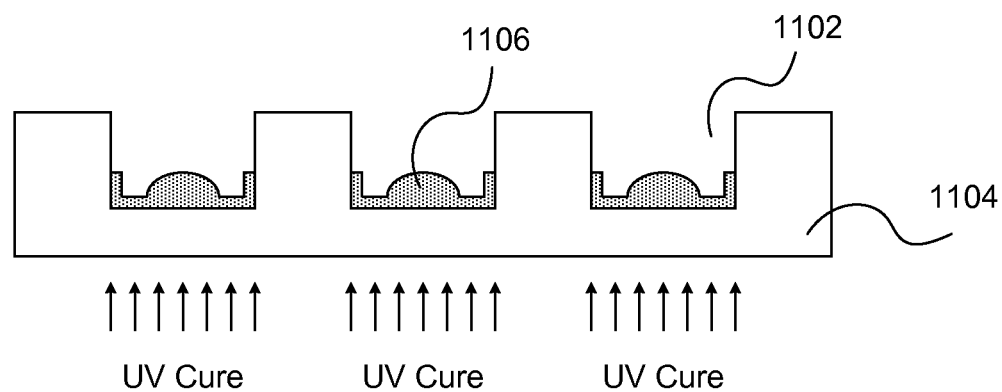
Figure 11C:
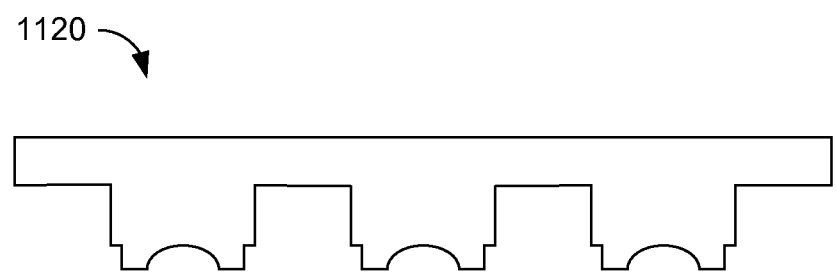

The second method for fabricating the UV-transparent mold for convex lens 500 includes using a substrate with holes. Referring to FIG. 11(*a*), substrate-with-holes device 1100 includes a substrate 1104 having holes 1102. In some exemplary embodiments, a convex lens 1106 is made in hole 1102 on substrate 1104 as shown in FIG. 11(*b*) using the step-and-repeat process of FIG. 8. Convex lenses 1106 are formed and cured by exposing them to UV light through substrate-with-holes device 1100. A UV-transparent mold 1120 can be replicated from substrate-with-holes device 1100 having convex lenses 1106 in holes 1102, without intermediate mold replication as shown in FIG. 11(*c*). UV-transparent mold 1120 may be a PDMS mold, which is cured by a cross-linking reaction to create an optically transparent polymer with the ability to reproduce surface micro features. UV-transparent mold 1120 can be used as the first and/or second UV-transparent mold in process 400 for fabricating suspended lenses in a spacer wafer as illustrated in FIG. 4.

Figure 12:
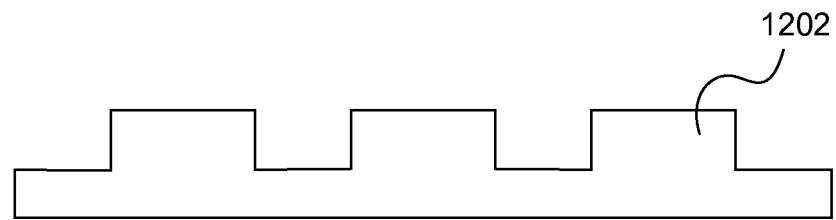
FIG. 12 includes a schematic cross-sectional diagram illustrating a substrate with pedestals having a UV-transparent substrate, according to some exemplary embodiments.

Fabrication of substrate-with-pedestals devices 700 and 1000, and substrate-with-holes devices 900 and 1100, according to some exemplary embodiments, will be described below in detail. First, fabrication of substrate-with-pedestals devices 700 and 1000 will be described. FIG. 12 includes a schematic cross-sectional view which illustrates a UV-transparent substrate 1202. In some exemplary embodiments, UV transparent substrate 1202 is machined flat on both sides, and then material is removed to form one or more pedestals of desired height.

Figure 13:
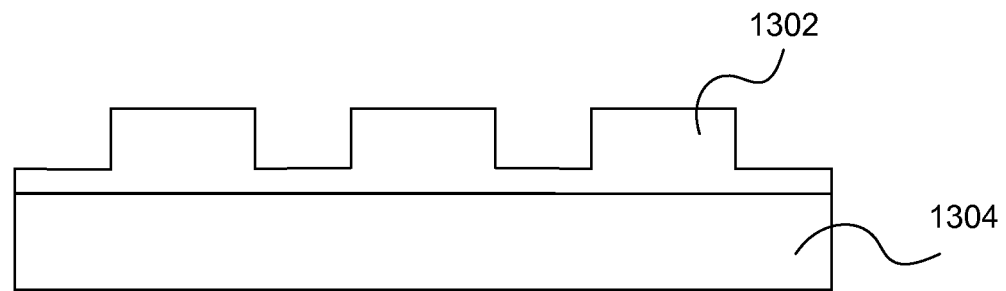
FIG. 13 includes a schematic cross-sectional diagram illustrating a substrate with pedestals having a UV-transparent substrate and a glass substrate, according to some exemplary embodiments.

FIG. 13 includes a schematic cross-sectional diagram which illustrates a UV-transparent substrate 1302 bonded to a glass substrate 1304. In some exemplary embodiments, UV-transparent substrate 1302 is machined flat on both sides, and then bonded to glass substrate 1304. Then, material of UV transparent substrate 1302 is removed to form pedestals of desired height.

Figure 14:
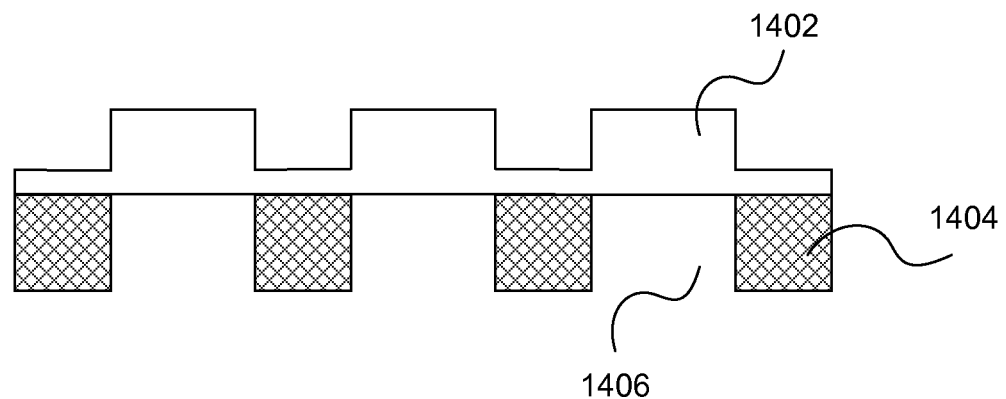
FIG. 14 includes a schematic cross-sectional diagram illustrating a substrate with pedestals having a UV-transparent substrate and a metal substrate having holes, according to some exemplary embodiments.

FIG. 14 includes a schematic cross-sectional diagram which illustrates a UV-transparent substrate 1402 bonded to an opaque substrate 1404 having holes 1406, according to some exemplary embodiments. After the bonding, material of UV transparent substrate 1402 is removed to form pedestals of desired height. Holes 1406 allow UV light to pass through opaque substrate 1404 to allow for UV curing of lenses formed on the pedestals by the step-and-repeat process described in detail herein in connection with FIG. 8. In some exemplary embodiments, opaque substrate 1404 may be a metal substrate.

Figure 15:
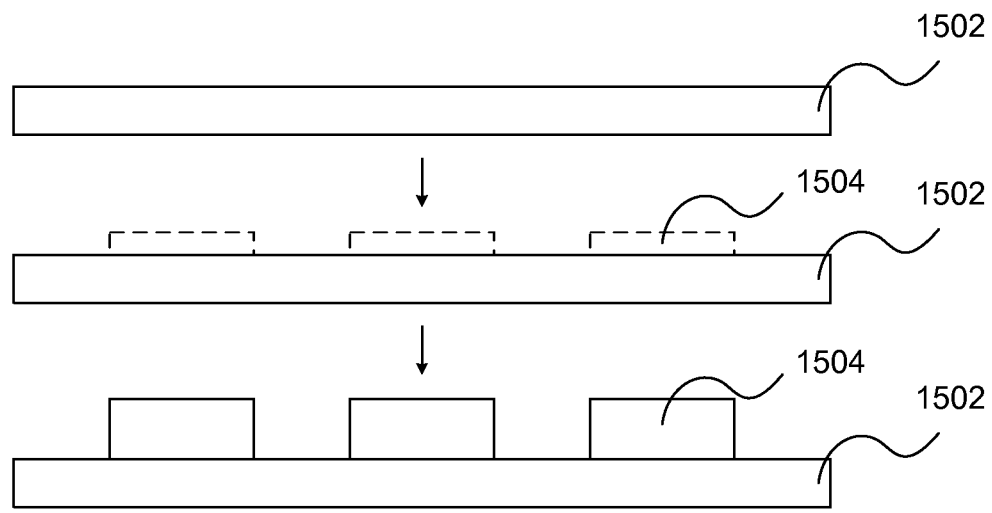
FIG. 15 includes schematic cross-sectional diagrams illustrating a substrate with pedestals having a glass substrate and a UV-curable material additively defining pedestals, according to some exemplary embodiments.

According to exemplary embodiments, other methods for fabrication of substrate-with-pedestals devices 700 and 1000 can be used. For example, FIG. 15 includes schematic block diagrams which illustrate a method of additive manufacturing on a glass substrate. Referring to FIG. 15, a flat parallel glass substrate 1502 is used as a build layer or base layer for an additive manufacturing process. A UV-curable material 1504 is used to additively define pedestals. Once adequate thickness has been deposited and UV-cured, pedestals 1504 can be machined to the appropriate thickness such that the desired pedestal height is obtained.

Figure 16:
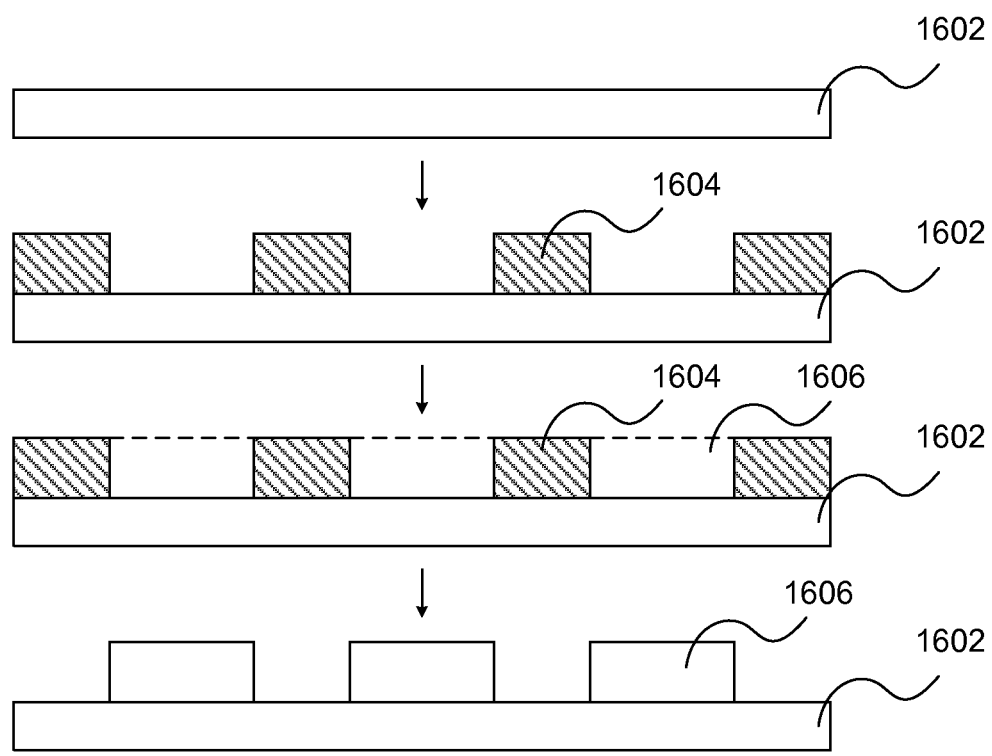
FIG. 16 includes schematic cross-sectional diagrams illustrating a substrate with pedestals having a glass substrate and a UV-curable material casted from a wax mold, according to some exemplary embodiments.

FIG. 16 includes schematic block diagrams which illustrate a method of casting from a wax mold, according to some exemplary embodiments. Referring to FIG. 16, a flat parallel glass substrate 1602 is used as a build layer or base layer for an additive manufacturing process. A UV-curable wax is used to define areas around air filled holes forming a wax mold 1604. Once an adequate thickness has been deposited, wax mold 1604 is filled with a UV-transparent epoxy 1606 or equivalent materials. In some exemplary embodiments, epoxy 1606 is a UV-curable material. After epoxy 1606 has cured by exposure to UV radiation, epoxy 1606 is machined to the appropriate thickness such that the desired pedestal height is achieved. Wax mold 1604 can be removed by melting it or dissolving it, or both.

Figure 17:
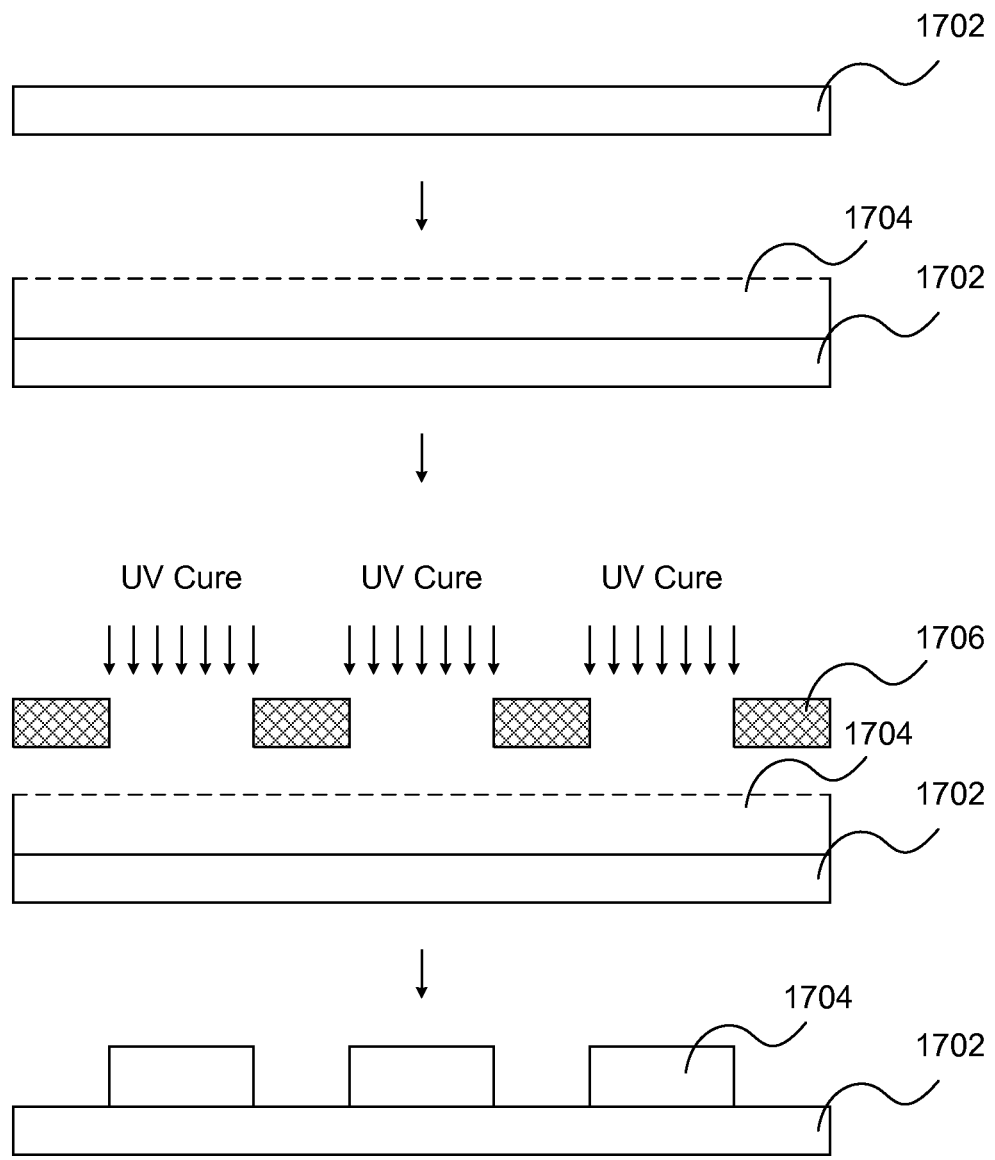
FIG. 17 includes schematic cross-sectional diagrams illustrating a substrate with pedestals having a glass substrate and a lithographically defined UV-curable photoresist, according to some exemplary embodiments.

FIG. 17 includes schematic block diagrams which illustrate a lithographically defined method, according to some exemplary embodiments. Referring to FIG. 17, a flat parallel glass substrate 1702 is used as a build layer or base layer for a lithographic process. A suitable UV-curable photoresist 1704 is spun onto glass substrate 1702 to the appropriate thickness, such that the desired pedestal height will be obtained. A mask 1706 is applied. UV-curable photoresist 1704 is UV exposed to cross link the photoresist, and the unexposed photoresist is then developed away. The lithographically defined pedestals can be machined to further control the height of the pedestals.

Figure 18:
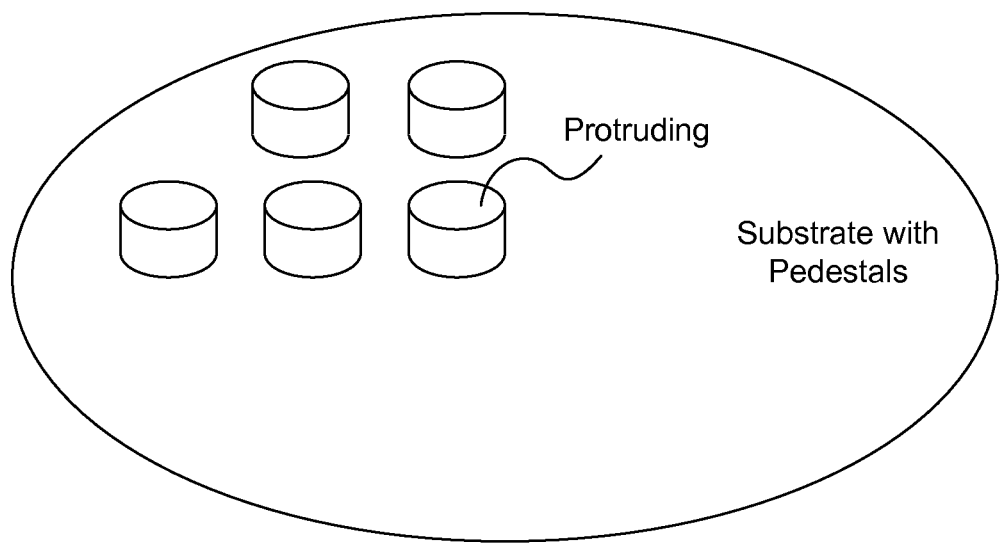
FIG. 18 includes perspective views of a substrate with pedestals and a substrate with holes, according to some exemplary embodiments.
Figure 18:
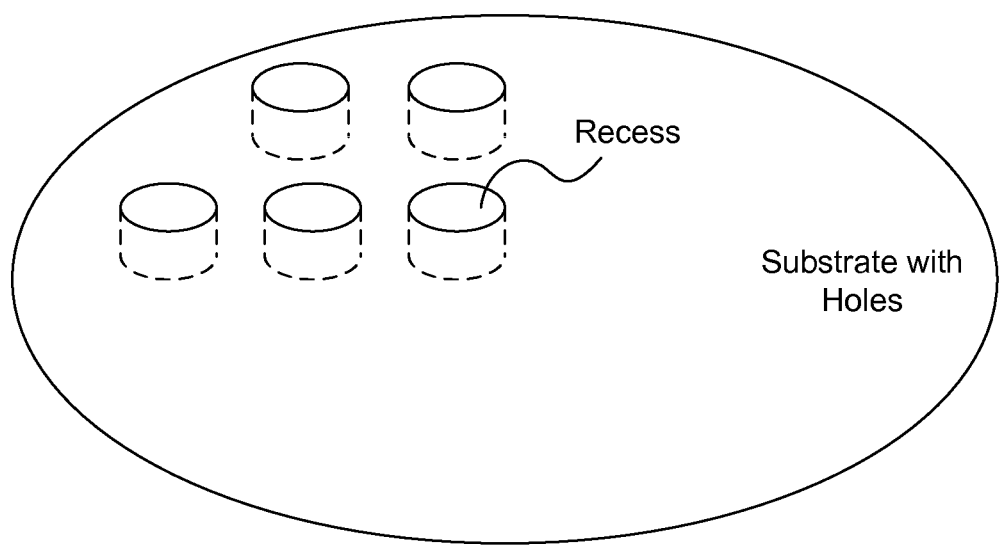

According to some exemplary embodiments, processes analogous to those described in connection with FIGS. 12-17 can be applied to the fabrication of substrate-with-holes devices 900 and 1100. Although the cross-sectional views of a substrate with pedestals and a substrate with holes look alike, pedestals protrude from a flat surface, and holes form recesses from a flat surface. FIG. 18 includes perspective views of substrate-with-pedestals devices and substrate-with-holes devices, according to some exemplary embodiments. According to some exemplary embodiments, the pedestals and holes can be of any of various shapes, including, for example, circular, square, rectangular, diamond or any other shape.

Figure 19:
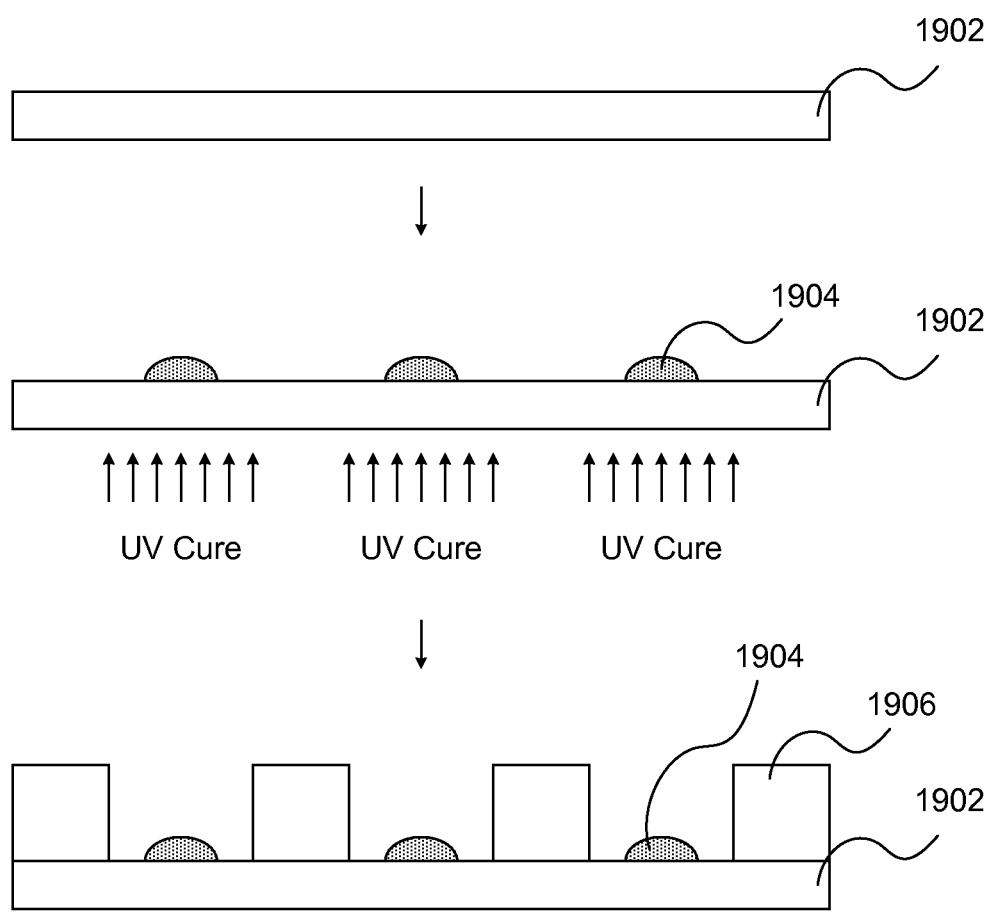
FIG. 19 includes schematic cross-sectional diagrams of a substrate with holes having lenses formed before holes are defined, according to some exemplary embodiments.

FIG. 19 includes schematic cross-sectional diagrams of a substrate with holes having lenses formed before holes are defined, according to exemplary embodiments. Referring to FIG. 19, for substrate-with-holes devices 900 and 1100, lenses 1904 can be formed and UV cured on a substrate 1902 before holes are defined on substrate 1902. Holes can be defined by depositing layer 1906 on substrate 1902 as shown in FIG. 19. Layer 1906 need not be UV transparent, since when it is deposited, lenses 1902 have been UV cured and fabricated.

Although the present disclosure is directed to the application of the fabricated UV-transparent molds to the fabrication of suspended lenses in a spacer wafer, it is understood by those of ordinary skill in the art that other applications of the fabricated UV-transparent molds of the present disclosure are possible.

Figure 20:
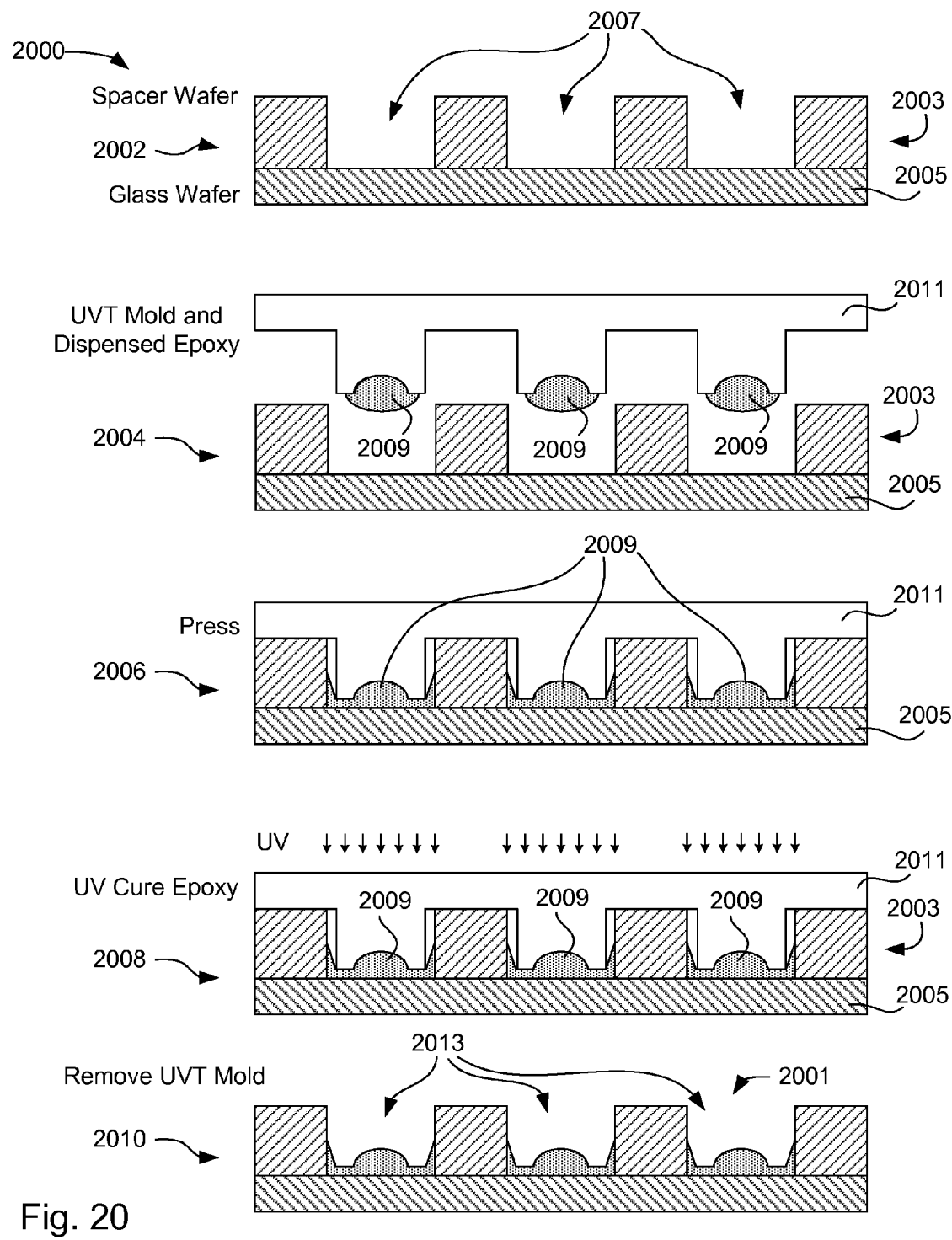
FIG. 20 includes schematic cross-sectional diagrams illustrating a process for fabricating a lens-in-a-pocket device using a UV-transparent (UVT) mold, according to some exemplary embodiments.

For example, FIG. 20 includes schematic cross-sectional diagrams illustrating a process 2000 for fabricating a lens-in-a-pocket device using a UVT mold, according to some exemplary embodiments. Referring to FIG. 20, in step 2002, a spacer wafer 2003 is bonded to a glass wafer 2005 forming pockets 2007. In step 2004, a drop of UV epoxy 2009 is dispensed into a UV-transparent mold 2011. In step 2006, UV-transparent mold 2011 is pressed against spacer wafer 2003. In step 2008, epoxy 2009 is UV-cured through UV-transparent mold 2011. In step 2010, UV-transparent mold 2011 is removed, and the lens-in-a-pocket devices 2013 are formed inside pockets 2007 formed by spacer wafer 2003 and glass wafer 2005. A plurality of "lens-in-a-pocket" devices 2013 can be formed on 2005 glass wafer to form a lens plate 2001.

Figure 21:
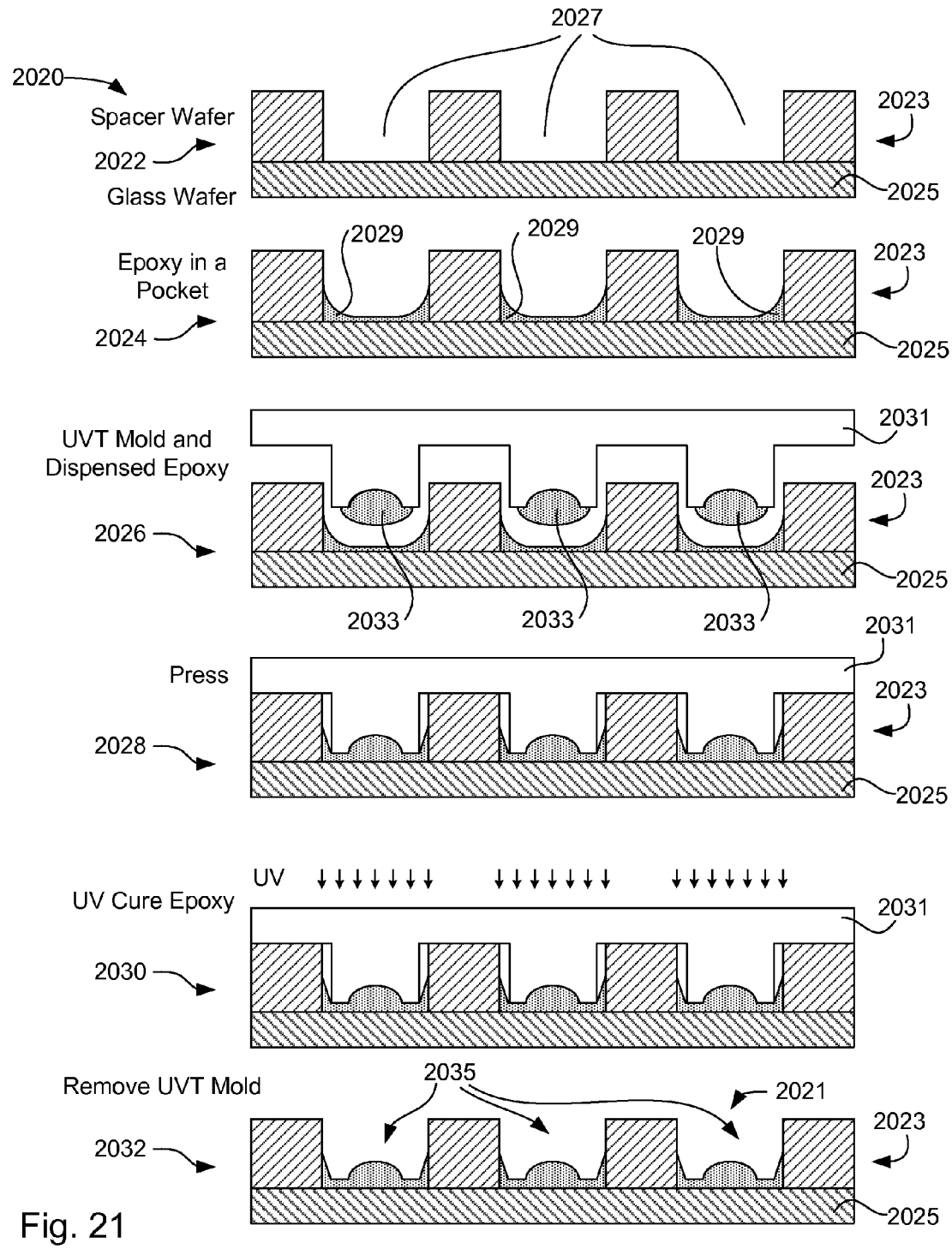
FIG. 21 includes schematic cross-sectional diagrams illustrating another process for fabricating a lens-in-a-pocket device using a UV-transparent (UVT) mold, according to some exemplary embodiments.

As another example, FIG. 21 includes schematic cross-sectional diagrams illustrating another process 2020 for fabricating a lens-in-a-pocket device using a UVT mold, according to some exemplary embodiments. In step 2022, a spacer wafer 2023 is bonded to a glass wafer 2025, forming pockets 2027. In step 2024, a drop of UV epoxy 2029 is dispensed into each pocket 2027. In step 2026, drops of UV epoxy 2033 are dispensed into a UV-transparent mold 2031. In step 2028, UV-transparent mold 2031 is pressed against spacer wafer 2023. In step 2030, epoxy 2029, 2033 is UV-cured through UV-transparent mold 2031. In step 2032, UV-transparent mold 2031 is removed, and lens-in-a-pocket devices 2035 are formed inside pockets 2027 formed by spacer wafer 2023 and glass wafer 2025. A plurality of "lens-in-a-pocket" devices 2035 can be formed on glass wafer 2025 to form a lens plate 2021.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, fabricating the lens can include performing a step-and-repeat process.

In any of the embodiments described in detail and/or claimed herein, fabricating the lens can include UV curing by passing UV light through the substrate with a hole or a pedestal.

In any of the embodiments described in detail and/or claimed herein, the substrate with a pedestal and/or the substrate with a hole can include a UV-transparent material.

In any of the embodiments described in detail and/or claimed herein, the substrate with a pedestal and/or the substrate with a hole can include a UV-transparent material and a glass substrate.

In any of the embodiments described in detail and/or claimed herein, the substrate with a pedestal and/or the substrate with a hole can include a UV-transparent material and an opaque substrate with at least one hole in the opaque substrate, wherein the at least one hole in the opaque substrate allows UV light to pass through the opaque substrate for curing the lens fabricated on the pedestal and/or the lens fabricated in the hole of the substrate.

In any of the embodiments described in detail and/or claimed herein, the substrate with a pedestal and/or the substrate with a hole comprise a glass substrate and an additively manufactured UV-curable material.

In any of the embodiments described in detail and/or claimed herein, the substrate with a pedestal and/or the substrate with a hole comprise a glass substrate and a UV-transparent epoxy cast from a wax mold.

In any of the embodiments described in detail and/or claimed herein, the substrate with a pedestal and/or the substrate with a hole comprise a glass substrate and a lithographically defined UV curable photoresist.

In any of the embodiments described in detail and/or claimed herein, the UV-transparent mold is a PDMS mold.

In any of the embodiments described in detail and/or claimed herein, the lens is fabricated on the substrate before the hole is defined on the substrate.

In any of the embodiments described in detail and/or claimed herein, the intermediate mold is a plastic mold.

In any of the embodiments described in detail and/or claimed herein, the lens plate comprises at least one of a suspended lens and a lens-in-a-pocket structure.

While the present disclosure makes reference to exemplary embodiments, it will be understood by those of ordinary skill in the art that various changes in form and details may be made therein without departing from the spirit and scope of the present disclosure, as defined by the following claims.

We claim:

1. A method of fabricating an ultraviolet (UV)-transparent mold, comprising:
    forming multiple pedestals on a single substrate, each pedestal protruding from the substrate;
    fabricating a lens on each pedestal, the fabricated lens on each pedestal having a diameter less than a diameter of the pedestal, in part by UV-curing a portion of material on each pedestal by passing UV light through the substrate;
    after fabricating a lens on each pedestal, replicating an intermediate mold from the substrate having the multiple pedestals thereon; and
    replicating the UV-transparent mold directly from the intermediate mold.

2. The method of claim 1, wherein fabricating the lens comprises performing a step-and-repeat process.

3. The method of claim 1, wherein the substrate with the pedestal comprises a UV-transparent material.

4. The method of claim 1, wherein the substrate with the pedestal comprises a UV-transparent material and a glass substrate.

5. The method of claim 1, wherein the substrate with the pedestal comprises a UV-transparent material and an opaque substrate with at least one hole in the opaque substrate, wherein the at least one hole in the opaque substrate allows UV light to pass through the opaque substrate for curing the lens fabricated on the pedestal.

6. The method of claim 1, wherein the substrate with the pedestal comprises a glass substrate and an additively manufactured UV-curable material.

7. The method of claim 1, wherein the substrate with the pedestal comprises a glass substrate and a UV-transparent epoxy cast from a wax mold.

8. The method of claim 1, wherein the substrate with the pedestal comprises a glass substrate and a lithographically defined UV-curable photoresist.

9. The method of claim 1, wherein the UV-transparent mold is a PDMS mold.

10. The method of claim 1, wherein the intermediate mold is a plastic mold.

11. A method of fabricating a lens plate, comprising:
    forming multiple pedestals on a single substrate, each pedestal protruding from the substrate;
    fabricating a lens on each pedestal, in part by ultraviolet (UV)-curing a portion of material on each pedestal by passing ultraviolet light through the substrate, the lens having smaller diameter than the pedestal;
    after fabricating a lens on each pedestal, replicating an intermediate mold from the substrate having the multiple pedestals thereon;
    replicating a UV-transparent mold directly from the intermediate mold; and
    replicating lenses in a spacer wafer from the UV-transparent mold.

12. The method of claim 11, wherein fabricating a lens on each pedestal comprises performing a step-and-repeat process.

13. The method of claim 11, wherein replicating lenses comprises one of replicating suspended lenses, each suspended lens adhered to sidewalls of the spacer wafer, and replicating lenses, each lens in a pocket formed by the spacer wafer and a glass wafer.

* * * * *